(12) United States Patent
Zhou

US011159672B2

(10) Patent No.: US 11,159,672 B2
(45) Date of Patent: Oct. 26, 2021

(54) METHOD FOR CONTROLLING PROXIMITY SENSOR, DEVICE, AND MOBILE TERMINAL

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 91 days.

(21) Appl. No.: 16/726,664

(22) Filed: Dec. 24, 2019

(65) Prior Publication Data

US 2020/0137215 A1 Apr. 30, 2020

Related U.S. Application Data

(63) Continuation of application No. PCT/CN2018/091081, filed on Jun. 13, 2018.

(30) Foreign Application Priority Data

Jul. 18, 2017 (CN) .......................... 201710585063.1

(51) Int. Cl.
H04M 1/72454 (2021.01)
H04W 52/02 (2009.01)

(52) U.S. Cl.
CPC ..... *H04M 1/72454* (2021.01); *H04W 52/027* (2013.01); *H04W 52/0254* (2013.01); *H04M 2250/12* (2013.01)

(58) Field of Classification Search
CPC ......... H04M 1/72569; H04M 2250/12; H04W 52/0254; H04W 52/027; H04W 52/0216;
(Continued)

(56) References Cited

U.S. PATENT DOCUMENTS 8,097,853 B2 * 1/2012 Ji .......................... G01S 7/4868
  250/340
8,373,666 B2 * 2/2013 Jung ..................... G06F 3/0488
  345/173
(Continued)

FOREIGN PATENT DOCUMENTS

CN 102411425 4/2012
CN 103178847 6/2013
(Continued)

OTHER PUBLICATIONS

WIPO, ISR for PCT/CN2018/091081, dated Sep. 10, 2018.
(Continued)

*Primary Examiner* — Lewis G West
(74) *Attorney, Agent, or Firm* — Hodgson Russ LLP

(57) ABSTRACT

The present disclosure provides a method for controlling a proximity sensor, a device, a storage medium and a mobile terminal. The method comprising outputting a driving signal, to a transmitting end and a receiving end of a proximity sensor, controlling the transmitting end to be in a sleep mode, an off mode, and an on mode periodically, controlling the receiving end to be in a sleep mode and a sampling mode periodically; controlling an analog-digital converter to store a first input signal, in a sampling period of the receiving end corresponding to the off mode, and controlling the analog-digital converter to clear the first input signal from a received second input signal, outputting a first intensity value corresponding to the second input signal after the clearing process, in a sampling period of the receiving end when it is in the on mode.

20 Claims, 8 Drawing Sheets

(58) Field of Classification Search
CPC ...... Y02D 30/70; Y02D 10/00; G01S 7/4876; G01S 17/88; G01S 17/04; G06F 1/3265; G06F 1/3262; G06F 1/3231; G06F 3/0304
See application file for complete search history.

(56) References Cited

U.S. PATENT DOCUMENTS

| | | | | |
|---|---|---|---|---|
| 9,063,010 | B2* | 6/2015 | Wu | H04M 1/72403 |
| 9,310,486 | B2* | 4/2016 | Guo | H04M 1/026 |
| 10,331,271 | B2* | 6/2019 | Wojzischke | G06F 3/0421 |
| 2009/0121889 | A1* | 5/2009 | Lin | G06F 1/3203 340/686.6 |
| 2012/0129579 | A1 | 5/2012 | Tam | |
| 2013/0023215 | A1* | 1/2013 | Wang | H04W 16/14 455/41.2 |
| 2013/0162457 | A1 | 6/2013 | Gangopadhyay et al. | |
| 2016/0169717 | A1 | 6/2016 | Zhitomirsky | |

FOREIGN PATENT DOCUMENTS

| | | |
|---|---|---|
| CN | 106303021 | 1/2017 |
| CN | 106357922 | 1/2017 |
| CN | 106506794 | 3/2017 |
| CN | 107422876 | 12/2017 |
| TW | 201328197 | 7/2013 |

OTHER PUBLICATIONS

SIPO, First Office Action for CN Application No. 201710585063.1, dated Mar. 14, 2019.
EPO, Office Action for EP Application No. 18835043.3, dated May 29, 2020.
IPI, Office Action for IN Application No. 201917053549, dated Jun. 9, 2021.
EPO, Office Action for EP Application No. 18835043.3, dated Aug. 20, 2021.

* cited by examiner

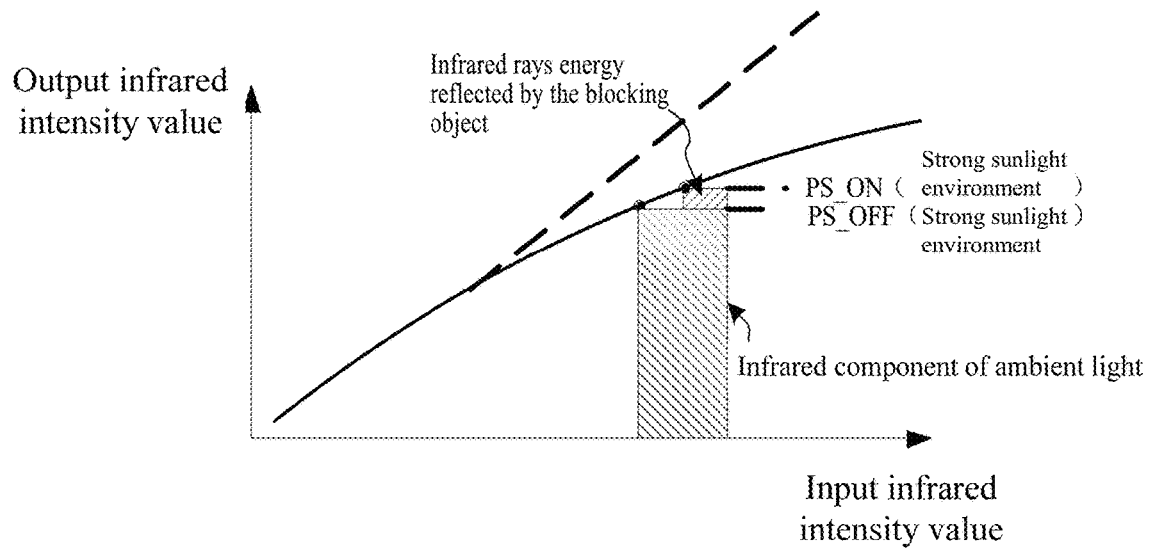

FIG. 5 a driving signal with a preset timing and a preset duty cycle is outputted to a transmitting end and a receiving end of a proximity sensor, the transmitting end is controlled to be in a sleep mode, an off mode, and an on mode periodically, and the receiving end is controlled to be in a sleep mode and a sampling mode periodically. —— S610 an analog-digital converter in the receiving end is controlled to store a first input signal, in a sampling period of the receiving end corresponding to the off mode. —— S620 the analog-digital converter in the receiving end is controlled to clear the first input signal from a received second input signal, and a first intensity value corresponding to the second input signal after the clearing process is outputted, thereby an approaching state or a leaving state is determined based on the first intensity value, in a sampling period of the receiving end corresponding to the on mode. —— S630

FIG. 6A a driving signal with a preset timing and a preset duty cycle is outputted to a transmitting end and a receiving end of a proximity sensor, the transmitting end is controlled to be in a sleep mode, a first off mode, an on mode and a second off mode periodically, and the receiving end is controlled to be in a sleep mode and a sampling mode periodically. — S710 an analog-digital converter in the receiving end is controlled to store a first input signal, in a sampling period of the receiving end corresponding to the first off mode. — S720 the analog-digital converter in the receiving end is controlled to clear the first input signal from a received second input signal, and a first intensity value corresponding to the second input signal after the clearing process is outputted, in a sampling period of the receiving end corresponding to the on mode. — S730 the analog-digital converter in the receiving end is controlled to clear the first input signal from a received third input signal, and a second intensity value corresponding to the third input signal is outputted after the clearing process, in a sampling period of the receiving end corresponding to the second off mode. — S740 an approaching state or a leaving state is determined based on the first intensity value and the second intensity value. — S750

FIG. 7A

METHOD FOR CONTROLLING PROXIMITY SENSOR, DEVICE, AND MOBILE TERMINAL

CROSS-REFERENCE TO RELATED APPLICATIONS

This application is a continuation of International Application No. PCT/CN2018/091081 filed on Jun. 13, 2018, which claims priority to Chinese Patent Application No. CN201710585063.1, filed on Jul. 18, 2017. The entire disclosures of the aforementioned applications are incorporated herein by reference.

TECHNICAL FIELD

The present disclosure relates to mobile terminal technologies, and particularly to a method for controlling a proximity sensor, a device, a storage medium and a mobile terminal.

BACKGROUND

As smartphones move toward thinness, the size of their components is getting smaller. In order to meet this requirement, the three-in-one sensor equipped with proximity sensor, ambient light sensor and infrared emitting light-emitting diode is widely used in smartphones.

Currently, smart phones automatically adjust the brightness of backlight of the liquid crystal display (LCD) through Ambient light sensor (ALS) monitoring the Ambient light intensity, or control the lighting and closing of the button light. Proximity sensor (PS) including a infrared emitting light-emitting diode, among them, the infrared emitting light-emitting diode as the sender of a proximity sensor, when used to call by infrared emission launch, and through the proximity sensor receiving end receives the face of the reflection of the infrared intensity values, according to the intensity values to judge whether smartphone is close to the face, when the smartphone is closed to the face, it can close the LCD backlight, have the effect of energy saving. Meanwhile, for the capacitive touch screen, it is also possible to turn off the drive signal output when it is close to the face to prevent misoperation.

However, the scenario of users using smart phones is complex and changeable. For example, when the sunlight intensity is very high, the infrared ray in the sunlight will be collected by the receiver close to the ambient light sensor, so that the intensity of the infrared ray received by the receiver reaches tens of thousands of lux, and the infrared ray emitted by the infrared emitting light-emitting diode occupies a very small proportion. As the approach to the sensor characteristic curve is non-linear, the linearity tends to be flat as the low noise value (such as infrared in ambient light) increases. Therefore, in a bright light environment, the proximity value will be smaller, at this time, even if the smartphone is close to the face, it couldn't control the screen off. For example, in the light box environment, due to the infrared interference in the fluorescent lamp caused by the measured value of close to the high and low, so that the mobile terminal cannot according to the face or the actual distance between the human ear and the screen, accurately control the screen on or off, and even may occur flashing screen problem.

SUMMARY

Therefore, the present disclosure provides a method for controlling a proximity sensor, a device, a storage medium and a mobile terminal, it can optimize the control scheme of the proximity sensor and realize the normal function of bright screen and off screen.

The embodiment of the present disclosure provides a method for controlling a proximity sensor, and the method includes:

outputting, a driving signal with a preset timing and a preset duty cycle, to a transmitting end and a receiving end of a proximity sensor, controlling the transmitting end to be in a sleep mode, an off mode, and an on mode periodically, and controlling the receiving end to be in a sleep mode and a sampling mode periodically;

controlling an analog-digital converter in the receiving end to store a first input signal, in a sampling period of the receiving end when it is in the off mode; and controlling the analog-digital converter in the receiving end to clear the first input signal from a received second input signal, and outputting a first intensity value corresponding to the second input signal after the clearing process, thereby determining an approaching state or a leaving state based on the first intensity value, in a sampling period of the receiving end when it is in the on mode.

In one embodiment, the off mode comprises a first off mode and a second off mode, the operation of controlling the transmitting end to be in a sleep mode, an off mode, and an on mode periodically includes:

controlling the transmitting end to be in the sleep mode, the first off mode, the on mode and the second off mode periodically; and the operation of controlling an analog-digital converter in the receiving end to store a first input signal in a sampling period of the receiving end when the transmitting end is in the off mode comprises:

controlling the analog-digital converter in the receiving end to store the first input signal in a sampling period of the receiving end when the transmitting end is in the first off mode.

The embodiment of the disclosure also provides a controlling device for a proximity sensor, and the device includes:

a driving signal outputting module, configured to output a driving signal with a preset timing and a preset duty cycle, to a transmitting end and a receiving end of a proximity sensor, control the transmitting end to be in a sleep mode, an off mode, and an on mode periodically, and control the receiving end to be in a sleep mode and a sampling mode periodically;

an input signal storing module, configured to control an analog-digital converter in the receiving end to store a first input signal in a sampling period of the receiving end when it is in the off mode; and a first signal correction module, configured to control the analog-digital converter in the receiving end to clear the first input signal from a received second input signal, and output a first intensity value corresponding to the second input signal after the clearing process, thereby determine an approaching state or a leaving state based on the first intensity value, in a sampling period of the receiving end when it is in the on mode.

The embodiment of the disclosure also provides a storage medium having a program stored therein. When the program is executed by a processor, the method for controlling a proximity sensor described in the embodiment of the disclosure is performed.

The embodiment of the disclosure also provides a mobile terminal, which includes a processor, a memory, and a program stored in the memory and executable by the processor, wherein the processor is configured to perform the method for controlling a proximity sensor described in the embodiment of the disclosure.

The method for controlling a proximity sensor, the device, the storage medium and the mobile terminal, provided by the embodiment of the disclosure, includes steps of: outputting, a driving signal with a preset timing and a preset duty cycle, to a transmitting end and a receiving end of a proximity sensor, controlling the transmitting end to be in a sleep mode, an off mode, and an on mode periodically, and controlling the receiving end to be in a sleep mode and a sampling mode periodically; controlling an analog-digital converter in the receiving end to store a first input signal, in a sampling period of the receiving end corresponding to the off mode; and controlling the analog-digital converter in the receiving end to clear the first input signal from a received second input signal, and outputting a first intensity value corresponding to the second input signal after the clearing process, thereby determining an approaching state or a leaving state based on the first intensity value, in a sampling period of the receiving end corresponding to the on mode. By deducting the infrared rays in the ambient light in the analog-digital converter, the influence of the infrared rays in the ambient light can be eliminated, and the problem of the screen not turned off when it is in the approaching state under strong light can be avoided. Meanwhile, the problem of the splash screen in the light box environment can be avoided, thereby achieving normal functions of the screen bright and off.

BRIEF DESCRIPTION OF THE DRAWINGS

FIG. 5 is a schematic diagram showing the relationship between the characteristic curve and the ideal curve of the proximity sensor under strong sunlight.

FIG. 6A is a schematic flowchart of a method for controlling a proximity sensor according to an embodiment of the present disclosure.

FIG. 7A is a schematic flowchart of another method for controlling a proximity sensor according to an embodiment of the present disclosure.

DETAILED DESCRIPTION

Before discussing exemplary embodiments in more detail, it should be mentioned that some exemplary embodiments are described as processes or methods described as flowcharts. Although flowcharts describe the steps as sequential processing, many of them can be performed in parallel, concurrently, or simultaneously. In addition, the sequence of steps can be rearranged. The processing can be terminated when its operation is complete, but it can also have additional steps not included in the diagram. The processing may correspond to methods, functions, procedures, subroutines, subroutines, etc.

In general, the function of the proximity sensor is to turn off the screen, when the user calls and the phone is close to the face, to achieve power saving and anti-false touch. For example, when the user answers or makes a call and the face is close to the phone, the screen is controlled to be turned off. If the user moves the phone away from the face and the proximity sensor is unobstructed, the screen is controlled to be turned on.

Figure 1:
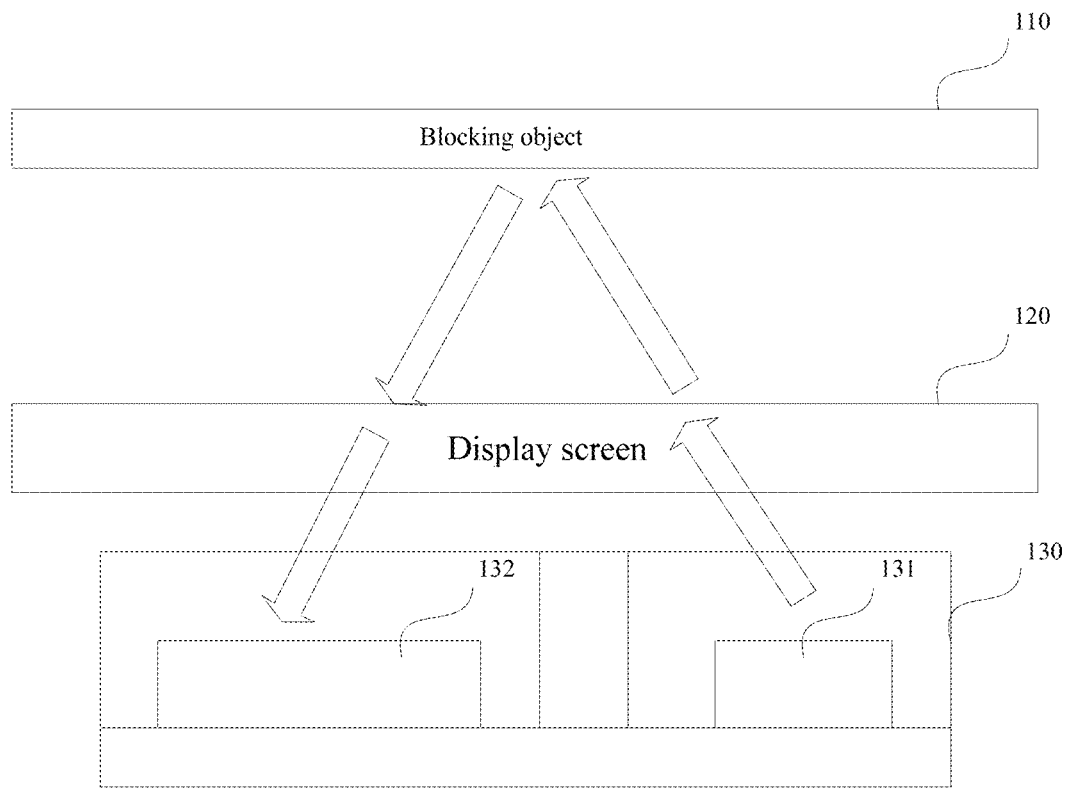
FIG. 1 is a schematic structural view of a proximity sensor.

In order to better understand the working principle of a proximity sensor, FIG. 1 provides a schematic structural diagram of a proximity sensor. As illustrated in FIG. 1, the proximity sensor includes a transmitting end 131 and a receiving end 132, infrared rays are emitted from the infrared LED lamp of the transmitting end 131, and are received by the receiving end 132. The proximity sensor 130 is disposed in a space formed by a display screen 120 and a housing, and may be disposed near a receiver. When an external blocking object 110 approaches the proximity sensor 130, the infrared rays emitted from the transmitting end 131 are reflected by the blocking object 110 and partially enter the receiving end 132. An internal chip processor of the receiving end 132 includes an analog-digital Converter (ADC), and an intensity value of the infrared rays entering the receiving end 132 is acquired by the analog-digital converter. When there is no blocking object, the intensity value of the infrared ray acquired by the receiving end 132 is the smallest, and when the blocking object is approaching, the intensity value of the infrared rays acquired by the receiving end 132 is continuously increased until the full scale is reached. Wherein, the range of the proximity sensor is related to the number of bits of the register inside the receiving chip. For example, for an 8-bit register, the full-scale is 256; for a 10-bit register, the full-scale is 1024, for a 12-bit register, the full-scale is 4096, and so on. Then, the intensity value of the infrared rays acquired by the receiving end is compared with a preset threshold, and the display screen is turned on or turned off according to the comparison result. For example, taking a proximity sensor with a 10-bit register as an example, the proximity value when the normal object is not blocked is 50. When the face is all close to the proximity sensor, the infrared rays are all reflected to the receiving end, and the proximity value is close to the full scale, which is about 1024.

In a non-bright light environment, it is usually prescribed that when the blocking object is 3-5 centimeter away, the screen is turned off, and when the blocking object is leaving away, the screen will also be changed. It means that, an approaching threshold and a leaving threshold may be preset. Under the bright screen state, the screen is turned off when an approaching value is larger than the approaching threshold (such as 400), under the off screen state, the screen is turned on when the approaching value is less than the leaving threshold (such as 300).

Figure 2:
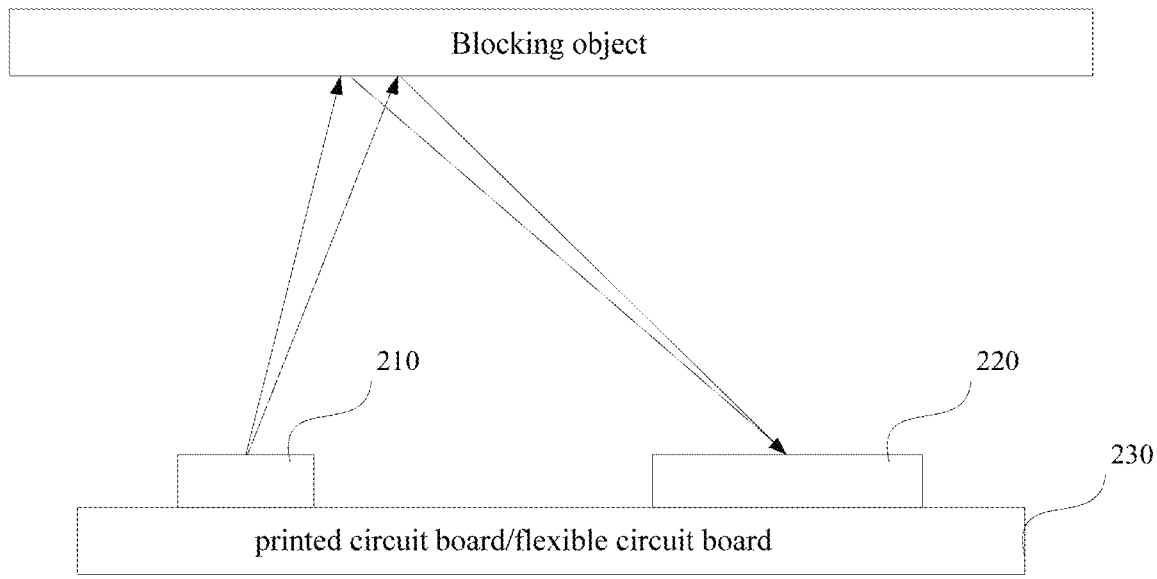
FIG. 2 is a schematic diagram of the operation of a proximity sensor.

In order to more vividly represent the working process of the proximity sensor, FIG. 2 is a schematic diagram of the operation of a proximity sensor. As illustrated in FIG. 2, a transmitting end 210, i.e., an infrared LED lamp, and a receiving end 220 are disposed on a printed circuit board 230

Figure 3:
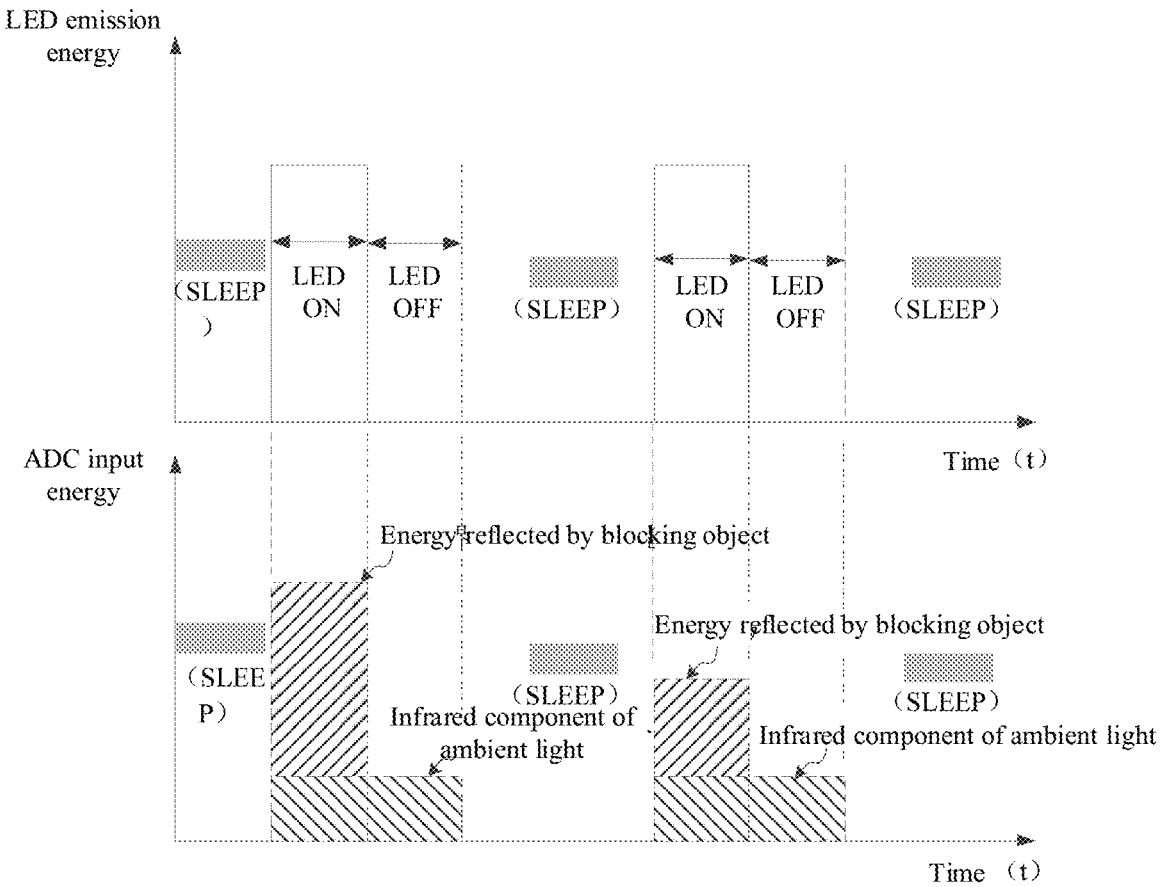
FIG. 3 is a schematic diagram showing the control logic of a transmitting end and a receiving end of a proximity sensor under strong light.

(or a flexible printed circuit board), and are isolated from each other. So the infrared rays cannot be directly transmitted from the infrared LED lamp to the receiving end 220. A first driving circuit (not shown) is disposed on the printed circuit board 230. As illustrated in FIG. 3, according to a preset control period, the first driving circuit outputs a control pulse to control the infrared LED lamp to be in a sleeping mode, an on mode (LED ON) and an off mode (LED OFF) periodically. Meanwhile, a second driving circuit (not shown) is disposed on the printed circuit board 230. According to a same preset control period, the second driving circuit controls the receiving end to receive infrared rays in a sleeping mode, a sampling mode, a sleeping mode, and so on, and to transmit the received infrared rays to the analog-digital converter.

In one embodiment, the infrared rays emitted by the transmitting end 210 are reflected by the blocking object and enter into the receiving end 220. The receiving end 220 samples during the LED ON and LED OFF periods. For example, the receiving end 220 performs two samplings under a strong light mode. The first sampling is to read the infrared intensity value of the receiving end 220 without turning on the LED lamp of the transmitting end 210, and a first intensity value a is acquired after transmitting the infrared intensity value to the analog-digital converter. The second sampling is to read the infrared intensity value of the receiving end 220 when the LED lamp of the transmitting end 210 is turned on, and a second intensity value b is acquired after transmitting the infrared intensity value to the analog-digital converter. Then, an actual infrared signal strength value is (b−a). Comparing the actual infrared signal strength value with a preset threshold, it can be determined that the mobile terminal is in an approaching state or a leaving state. The sequence of the LED lamp modes is not limited. In another embodiment, as illustrated in FIG. 3, the receiving end 220 performs two samplings with different sequence of the LED lamp modes. The first sampling is to read the infrared intensity value of the receiving end 220 when the LED lamp of the transmitting end 210 is turned on, and a first intensity value a is acquired after transmitting the infrared intensity value to the analog-digital converter. The second sampling is to read the infrared intensity value of the receiving end 220 when the LED lamp of the transmitting end 210 is turned off, and a second intensity value b is acquired after transmitting the infrared intensity value to the analog-digital converter. Then, an actual infrared signal strength value is (a−b). Comparing the actual infrared signal strength value with a preset threshold, it can be determined that the mobile terminal is in the approaching state or the leaving state.

Figure 4:
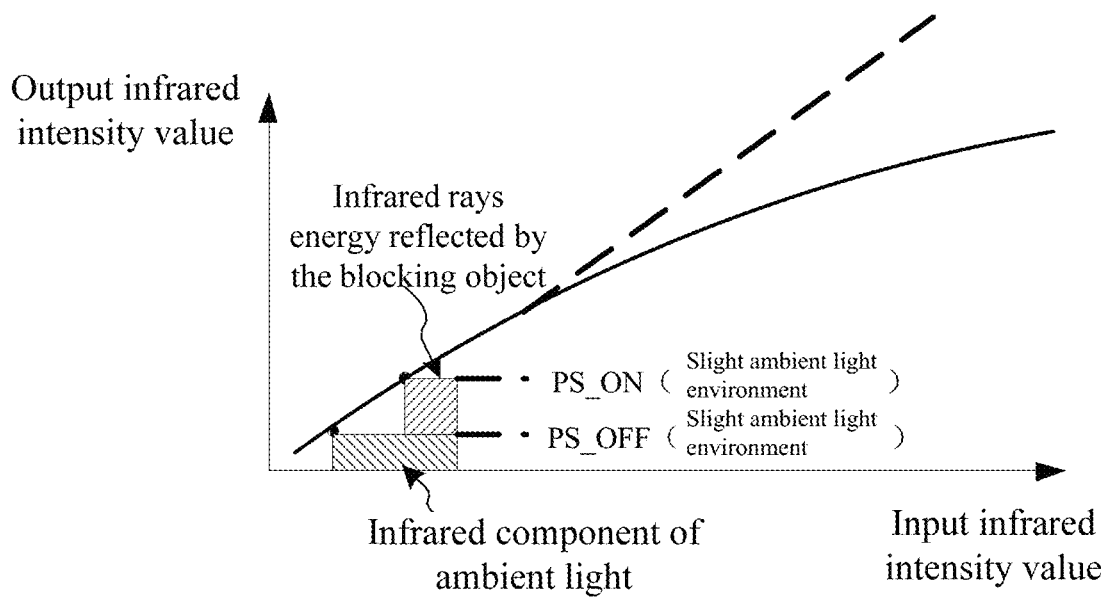
FIG. 4 is a schematic diagram showing the relationship between the characteristic curve and the ideal curve of the proximity sensor under slight ambient light.

In one embodiment, when using the receiver to talk, the infrared rays emitted by the infrared LED lamp is reflected by the face into the receiving end, the mobile terminal calculates, according to the above describe manner, the proximity value by reading the infrared intensity value of the receiving end, and determines whether the mobile terminal is close to the face according to the proximity value. When the mobile terminal is determined to be close to the face, the LCD backlight is turned off to save power. Meanwhile, for a capacitive touch screen, the driving signals are stopped to output to the touch screen, thereby preventing false touch. In addition, it is also possible to apply simple gesture recognition by setting a plurality of proximity sensors. Since the linearity of the proximity sensor chip (characteristic curve of the proximity sensor, that is, the solid line in FIG. 4 and FIG. 5) is technically limited to achieve an ideal state (ideal curve, that is, the broken line in FIG. 4 and FIG. 5). When the user uses the mobile terminal under strong light, the proximity value becomes smaller as the low noise value becomes larger. As illustrated in FIGS. 4 and 5, the proximity value under strong sunlight (PS_ON-PS_OFF) is smaller than the proximity value under slight ambient light. Moreover, the stronger the ambient infrared intensity, the higher the low noise, and the proximity value will become smaller and smaller. At this time, even if the mobile terminal is close to the face, the proximity value is still smaller than a first threshold, resulting in failure to extinguish the screen. The method for controlling a proximity sensor provided by the embodiment of the present application can solve the problem that failure to extinguish the screen under strong light, as mentioned above.

Figure 6B:
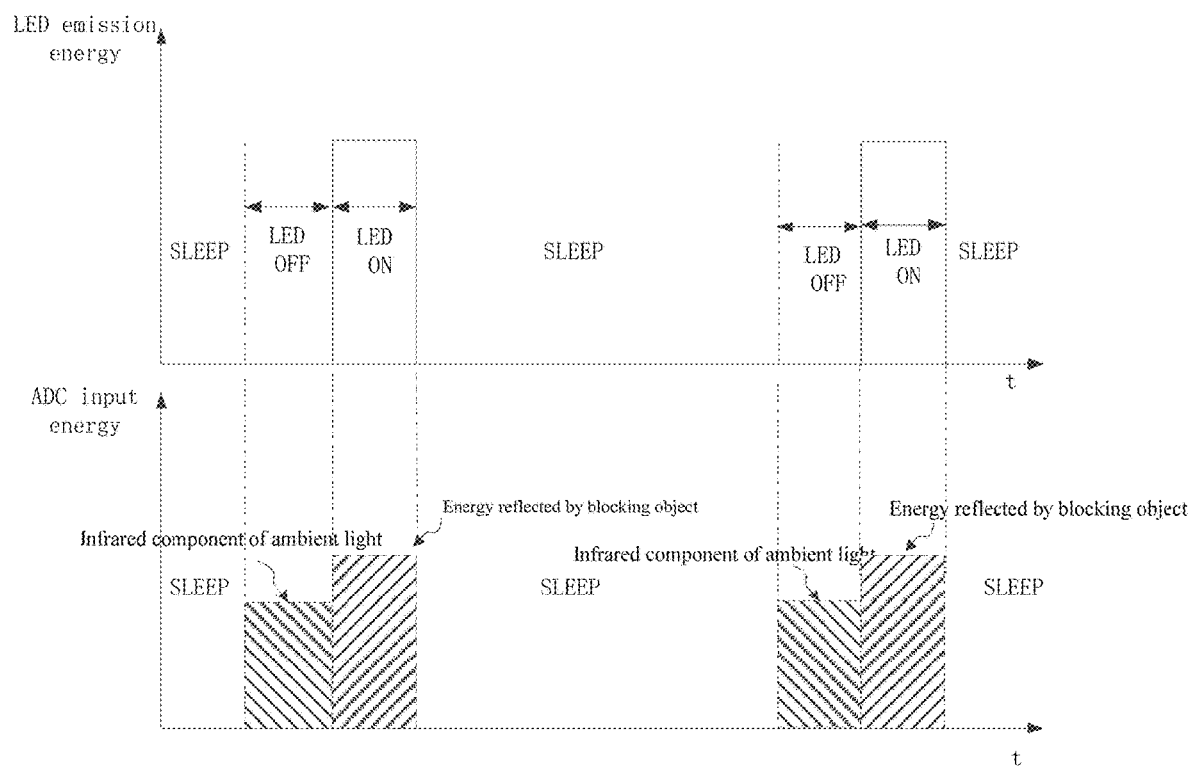
FIG. 6B is a schematic diagram showing the control logic of a transmitting end and a receiving end of a proximity sensor under strong light, according to an embodiment of the present disclosure.

FIG. 6A is a schematic flowchart of a method for controlling a proximity sensor according to an embodiment of the present disclosure. The method can be performed by a controlling device for proximity sensor. Wherein, the device can be implemented by at least one of software and hardware, and can generally be integrated in a mobile terminal. As illustrated in FIG. 6A, the method includes the following steps S610 to S630.

In a step S610, a driving signal with a preset timing and a preset duty cycle is outputted to a transmitting end and a receiving end of a proximity sensor, the transmitting end is controlled to be in a sleep mode, an off mode, and an on mode periodically, and the receiving end is controlled to be in a sleep mode and a sampling mode periodically.

The preset timing indicates the time sequence in which the LED lamp of the transmitting end is in the on mode, the off mode, and the sleep mode, and the time sequence in which the receiving end is in the sampling mode and the sleep mode. For example, as illustrated in FIG. 6A, a driving signal for the transmitting end can control the LED lamp of the transmitting end to sequentially enter the sleep mode, the off mode and the on mode in one control cycle according to the preset timing. For another example, a driving signal for the transmitting end can also control the LED lamp of the transmitting end to sequentially experience the off mode, the on mode and the sleep mode in one control cycle according to the preset timing. A driving signal for the receiving end can control the receiving end to sequentially experience the sleep mode and the sampling mode in one control cycle according to the preset timing.

The duty cycle indicates how long the LED lamp of the transmitting end in the on mode, the off mode and the sleep mode respectively, and how long the receiving end in the sampling mode and the sleep mode respectively. The LED lamp of the transmitting end and the receiving end are in the sleep mode most of the time, and the working time in one control cycle is about 1/10. For example, the time distribution of the LED lamp in the off mode, the on mode and the sleep mode is about 1-1-8 (i.e., the time that the LED lamp is in the off mode is about 1/10, the time that the LED lamp is in the on mode is about 1/10, and the time that the LED lamp is in the sleep mode is about 8/10). The time distribution of the receiving end in the sampling mode and the sleep mode is about 2-8 (i.e., the time that the receiving end is in the sampling mode is about 2/10, and the time that the receiving end is in the sleep mode is about 8/10).

The mobile terminal outputs a driving signal with a preset timing and a preset duty cycle to the LED lamp of the transmitting end and the receiving end of a proximity sensor, the LED lamp of the transmitting end is controlled to be in the sleep mode, the off mode, and the on mode periodically, and the receiving end is controlled to be in the sleep mode and the sampling mode periodically.

In a step S620, an analog-digital converter in the receiving end is controlled to store a first input signal, in a sampling period of the receiving end when the transmitting end is in the off mode.

The first input signal is formed by the ambient infrared rays acquired by the receiving end when the LED lamp of the transmitting end is in the off mode. In the sampling period of the receiving end when the LED lamp of the transmitting end is in the off mode, the receiving end is controlled to receive ambient infrared rays as the first input signal, and output the first input signal to the analog-digital converter of the receiving end. It is should be noted, the analog-digital converter includes a plurality of preset working units, and the plurality of preset working units are configured to store the first input signal. It is understood that, the implementation hardware of the plurality of working units may be an electronic component having an energy storage function, such as a capacitor. Since the receiving end of the proximity sensor can receive infrared rays through the photodiode and convert the optical signals into electrical signals as output, the output electrical signal is recorded as the first input signal. The first input signal is transmitted to the analog-digital converter. The analog-digital converter is controlled to store the first input signal in the plurality of preset working units, that is, the first input signal is stored by the capacitor, which is worked as preset working units.

When the LED lamp of the receiving end is switched to the on mode from the off mode, the number of the preset working units occupied by the first input signal is recorded as a reference value. For example, assuming that the analog-digital converter has 1000 preset working units, the first input signal obtained by the receiving end is input to the working units of the analog-digital converter in the sampling period of the receiving end corresponding to the LED lamp in the off mode. Moreover, the first input signal is automatically stored in a next working unit after occupying one working unit. When the LED lamp of the receiving end is switched to the on mode from the off mode, the number of the preset working units occupied by the first input signal is recorded. Assuming that the number of the preset working units occupied by the first input signal is 300, then the reference value is determined as 300. Then, the data in the preset working units that have been occupied by the first input signal can be cleared, so that the receiving end can store the second signal from the first one of the working units, in the sampling period of the receiving end when the LED lamp of the transmitting end is in the on mode. Therefore, the storage space is prevented from being occupied by useless data, resulting in waste of storage resources. In one embodiment, the data in the preset working units that have been occupied by the first input signal may not be cleared instantly, and the first input signal and the second input signal are uniformly cleared after a control cycle.

It is understood that, the manner of determining the reference value enumerated in this embodiment is only one specific example, not limited to determine the reference value.

In a step S630, the analog-digital converter in the receiving end is controlled to clear the first input signal from a received second input signal, and a first intensity value corresponding to the second input signal after the clearing process is outputted, thereby the proximity sensor is selectively in an approaching state and a leaving state is determined based on the first intensity value, in a sampling period of the receiving end when the transmitting end is in the on mode.

The second input signal is formed by ambient infrared rays and infrared rays received by the receiving end, and the infrared rays are emitted from the LED light and reflected by a blocking object when the LED lamp of the transmitting end is in the on mode. In a sampling period of the receiving end when the LED lamp of the transmitting end is in the on mode, the receiving end is controlled to acquire infrared rays and ambient infrared rays as the second input signal, and the second input signal is outputted to the analog-digital converter, wherein the infrared rays are emitted from the transmitting end and reflected by the blocking object. The analog-digital converter can be controlled to input the second input signal to the preset working units from the first one of the working units. The analog-digital converter can also be controlled to input the second input signal to the preset working units from a particular one with a preset number of the working units. The data in the preset working units that have been occupied by the second input signal is cleared, when the number of the preset working units occupied by the second input signal is equal to the reference value.

When the screen is turned on, the first intensity value is compared with a first threshold, and the proximity sensor is determined in the approaching state when the first intensity value is greater than the first threshold. The first threshold is a preset proximity threshold of a display under a strong light environment.

When the screen is turned off, the first intensity value is compared with a second threshold, and the proximity sensor is determined in the leaving state when the first intensity value is less than the second threshold. Wherein the second threshold is a preset distant threshold under a strong light environment control by the display.

The method for controlling a proximity sensor provided by the embodiment of the disclosure, includes steps of: outputting, a driving signal with a preset timing and a preset duty cycle, to a transmitting end and a receiving end of a proximity sensor, controlling the transmitting end to be in a sleep mode, an off mode, and an on mode periodically, and controlling the receiving end to be in a sleep mode and a sampling mode periodically; controlling an analog-digital converter in the receiving end to store a first input signal, in a sampling period of the receiving end corresponding to the off mode; and controlling the analog-digital converter in the receiving end to clear the first input signal from a received second input signal, and outputting a first intensity value corresponding to the second input signal after the clearing process, thereby determining an approaching state or a leaving state based on the first intensity value, in a sampling period of the receiving end corresponding to the on mode. By deducting the infrared rays in the ambient light in the analog-digital converter, the influence of the infrared rays in the ambient light can be eliminated, and the problem of the screen not turned off when it is in the approaching state under strong light can be avoided. Meanwhile, the problem of the splash screen in the light box environment can be avoided, thereby achieving normal functions of the screen bright and off.

FIG. 7A is a schematic flowchart of another method for controlling a proximity sensor according to an embodiment of the present disclosure. As illustrated in FIG. 7A, the method includes the following steps of S710 to S750.

In a step S710, a driving signal with a preset timing and a preset duty cycle is outputted to a transmitting end and a receiving end of a proximity sensor, the transmitting end is controlled to be in a sleep mode, a first off mode, an on mode and a second off mode periodically, and the receiving end is controlled to be in a sleep mode and a sampling mode periodically.

Figure 7B:
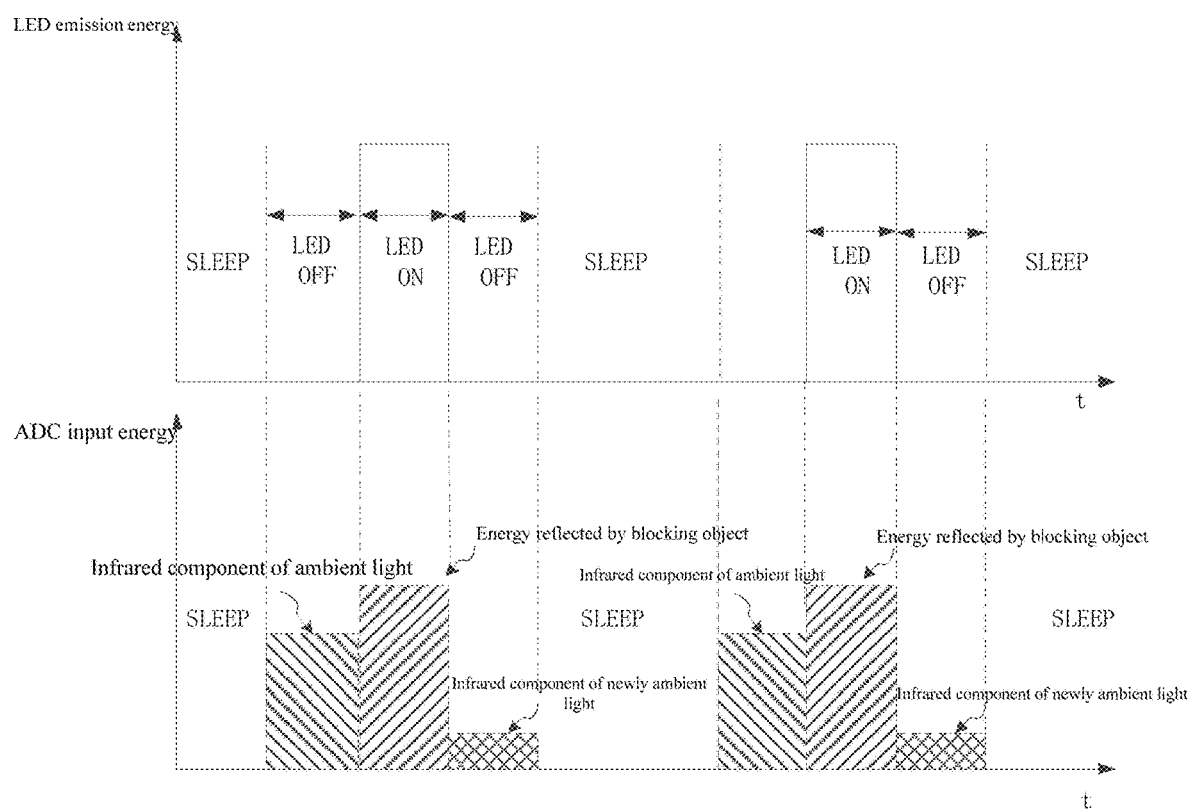
FIG. 7B is another schematic diagram showing the control logic of a transmitting end and a receiving end of a proximity sensor under strong light, according to an embodiment of the present disclosure.

As illustrated in FIG. 7B, a driving signal can for the transmitting end can control the LED lamp of the transmitting end to sequentially enter the sleep mode, the first off mode, the on mode and the second off mode in one control cycle according to the preset timing. For another example, a driving signal for the transmitting end can also control the LED lamp of the transmitting end to sequentially enter the first off mode, the on mode, the second off mode and the sleep mode in one control cycle according to the preset timing. The driving signal for the receiving end can control the receiving end to sequentially enter the sleep mode and the sampling mode in one control cycle according to the preset timing. Wherein, in one control cycle, the sampling period of the receiving end corresponding to the sampling mode, is corresponding to the sampling period of the transmitting end when it is in the first off mode, the on mode and the second off mode.

The LED lamp of the transmitting end and the receiving end are in the sleep mode most of the time in one control cycle, and the working time in one control cycle is about 1/10. For example, the time distribution of the LED lamp in the first off mode, the on mode, the second off mode and the sleep mode is about 1-1-1-7. Correspondingly, the time distribution of the receiving end in the sampling mode and the sleep mode is about 3-7.

A driving signal with a preset timing and a preset duty cycle is outputted from a mobile terminal, to the LED lamp of the transmitting end and the receiving end of a proximity sensor, the LED lamp of the transmitting end is controlled to be in the sleep mode, the first off mode, the on mode and the second off mode periodically, and the receiving end is controlled to be in the sleep mode and the sampling mode periodically.

In a step S720, an analog-digital converter in the receiving end is controlled to store a first input signal, in a sampling period of the receiving end corresponding to the first off mode.

In one control cycle, the timing of the first mode is before the on mode. In the sampling period of the LED lamp of the transmitting end when it is in the first off mode, the receiving end is controlled to receive ambient infrared rays as the first input signal, and output the first input signal to the analog-digital converter. The analog-digital converter stores the first input signal in a plurality of preset working units. When the LED lamp of the receiving end is switched to be in the on mode from the first off mode, the number of the preset working units occupied by the first input signal is recorded as a reference value.

Then, the data in the preset working units that have been occupied by the first input signal can be cleared, so that the receiving end can store the second signal in the working units from the first one of working units, in the sampling period of the receiving end when the LED lamp of the transmitting end is in the on mode. Illustratively, When the preset working units is a capacitor, the method of clearing the data in the occupied working units may be to ground the capacitor to introduce the electrical signal stored in the capacitor into the ground, thereby achieving the purpose of clearing the data.

In a step S730, the analog-digital converter in the receiving end is controlled to clear the first input signal from a received second input signal, and a first intensity value corresponding to the second input signal after the clearing process is outputted, in a sampling period of the receiving end corresponding to the on mode.

In a sampling period of the receiving end when the LED lamp of the transmitting end is in the on mode, the receiving end is controlled to receive infrared rays and ambient infrared rays as the second input signal, and the second input signal is outputted to the analog-digital converter. The data in the preset working units that has been occupied by the second input signal is cleared when the number of the plurality of preset working units occupied by the second input signal is equal to the reference value.

Then, the data in the preset working units that has been occupied by the second input signal is cleared, so that, the receiving end can stores the third input signal in the preset working units from the first one of the preset working units, in a sampling period of the receiving end when the LED lamp of the transmitting end is in the second off mode.

In a step S740, the analog-digital converter in the receiving end is controlled to clear the first input signal from a received third input signal, and a second intensity value corresponding to the third input signal is outputted after the clearing process, in a sampling period of the receiving end corresponding to the second off mode.

Wherein, in one control cycle, the timing of the second off mode is after the on mode, so that, the receiving end is controlled to receive ambient infrared rays as the third input signal, and output the third input signal to the analog-digital converter, in a sampling period of the receiving end when the LED lamp of the transmitting end is in the second off mode. The third input signal can be stored in the preset working units. The analog-digital converter can store the third input signal in the preset working units from the first one of the working units. The analog-digital converter can also be controlled to store the second input signal to the preset working unit from a particular one with a preset number of the working units.

The data in the preset working units that has been occupied by the third input signal is cleared when the number of the preset working units occupied by the third input signal is equal to the number of the preset working units occupied by the first input signal. Since the process of acquiring the third input signal by the receiving end is continuous, the receiving end continues to acquire the third input signal when the LED lamp of the transmitting end is in the second off mode, and the newly received third input signal (the energy column corresponding to the infrared component of the new ambient rays in FIG. 7B) is sent to the analog-digital converter. The analog-digital converter performs a converting process on the third input signal stored in the working units from analog signal to digital signal, when the LED lamp of the transmitting end is switched to be in sleep mode from the second off mode, and the second intensity value corresponding to the third input signal after the clearing process is output.

In a step S750, an approaching state or a leaving state is determined based on the first intensity value and the second intensity value.

A proximity value is obtained by calculating an absolute value of the difference between the first intensity value and the second intensity value, the proximity sensor is determined in the approaching state when the proximity value is greater than a first threshold, and the proximity sensor is determined in the leaving state when the proximity value is less than a second threshold. The benefits of this setup are: it is avoided that the first input signal is subtracted from the second input signal due to technical limitations, and the energy corresponding to the ambient infrared component cannot be completely deducted, so that the first intensity value may affect the detection accuracy by including a small amount of energy corresponding to the ambient infrared component. In addition, a jump of the proximity sensor is about 1% of the proximity value, and the difference between the first intensity value and the second intensity value can reduce the proximity value, make the jump of the proximity sensor more stable, and further improve the detection accuracy.

The method for controlling a proximity sensor provided by the embodiment of the disclosure, includes steps of: outputting, a driving signal with a preset timing and a preset duty cycle, to a transmitting end and a receiving end of a proximity sensor, controlling the transmitting end to be in a sleep mode, a first off mode, an on mode and a second off mode periodically, and controlling the receiving end to be in a sleep mode and a sampling mode periodically; controlling the analog-digital converter in the receiving end to clear the first input signal from a received third input signal, and outputting a second intensity value corresponding to the third input signal after the clearing process, in a sampling period of the receiving end corresponding to the second off mode, and determining the approaching state or the leaving state based on the first intensity value and the second intensity value. By deducting the infrared rays in the ambient light in the analog-digital converter, the influence of the infrared rays in the ambient light can be eliminated, and the problem of the screen not turned off when it is in the approaching state under strong light can be avoided. Meanwhile, the problem of the splash screen in the light box environment can be avoided, thereby achieving normal functions of the screen bright and off.

Figure 8:
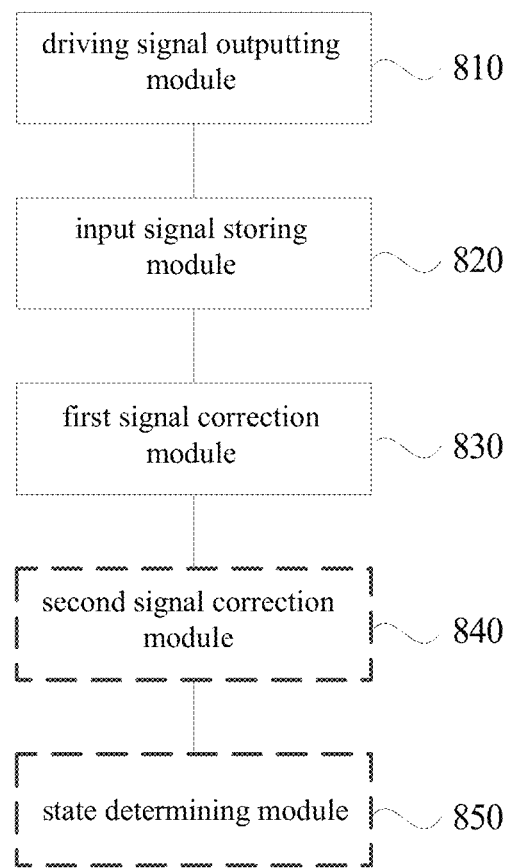
FIG. 8 is a schematic structural view of a controlling device for a proximity sensor according to an embodiment of the present disclosure.

FIG. 8 is a schematic structural view of a controlling device for a proximity sensor according to an embodiment of the present disclosure. The device is implemented by at least one of software and hardware, and is generally integrated in a mobile terminal. As illustrated in FIG. 8, the device includes a driving signal outputting module 810, an input signal storing module 820 and a first signal correction module 830.

The driving signal outputting module 810 is configured to output a driving signal with a preset timing and a preset duty cycle, to a transmitting end and a receiving end of a proximity sensor, control the transmitting end to be in a sleep mode, an off mode, and an on mode periodically, and control the receiving end to be in a sleep mode and a sampling mode periodically.

The input signal storing module 820 is configured to control an analog-digital converter in the receiving end to store a first input signal in a sampling period of the receiving end corresponding to the off mode.

The first signal correction module 830 is configured to control the analog-digital converter in the receiving end to clear the first input signal from a received second input signal, and output a first intensity value corresponding to the second input signal after the clearing process, thereby determine an approaching state or a leaving state based on the first intensity value, in a sampling period of the receiving end corresponding to the on mode.

In the controlling device for a proximity sensor provided by the embodiment of the disclosure, by changing the control method of the receiving end and the transmitting end of the proximity sensor, and deducting the infrared rays in the ambient light in the analog-digital converter, the influence of the infrared rays in the ambient light can be eliminated, and the problem of the screen not turned off when it is in the approaching state under strong light can be avoided. Meanwhile, the problem of the splash screen in the light box environment can be avoided, achieving normal functions of the screen bright and off.

In one embodiment, the device further includes a second signal correction module 840 and a state determining module 850.

The second signal correction module 840, when the off mode comprises a first off mode and a second off mode, is configured to control the analog-digital converter in the receiving end to clear the first input signal from a received third input signal, and output a second intensity value corresponding to the third input signal after the clearing process, in a sampling period of the receiving end corresponding to the second off mode.

The state determining module 850 is configured to determine an approaching state or a leaving state based on the first intensity value and the second intensity value.

In one embodiment, the input signal storing module is configured to control an analog-digital converter in the receiving end to store a first input signal in a sampling period of the receiving end corresponding to the off mode by execute the steps of:

controlling the receiving end to acquire ambient infrared rays as the first input signal, and outputting the first input signal to the analog-digital converter in the receiving end, in the sampling period of the receiving end corresponding to the off mode;

controlling the analog-digital converter to store the first input signal in a plurality of preset working units; and recording the number of the preset working units occupied by the first input signal as a reference value, and clearing the preset data in the working units that has been occupied by the first input signal, when the receiving end is switched to be in the on mode from the off mode.

In one embodiment, the first signal correction module is configured to control the analog-digital converter in the receiving end to clear the first input signal from a received second input signal, and output a first intensity value corresponding to the second input signal after the clearing process, in a sampling period of the receiving end corresponding to the on mode by execute the steps of:

in a sampling period of the receiving end corresponding to the on mode, control the receiving end to acquire infrared rays and ambient infrared rays as the second input signal, and output the second input signal to the analog-digital converter, wherein the infrared rays are emitted from the transmitting end and reflected by a blocking object;

controlling the analog-digital converter to store the second input signal in the preset working units; and clearing the preset data in the working units that has been occupied by the second input signal when the number of the preset working units occupied by the second input signal is equal to the reference value.

Wherein, when the off mode comprises a first off mode and a second off mode, the driving signal outputting module is configured to control the transmitting end to be in a sleep mode, an off mode, and an on mode periodically by execute the steps of:

controlling the transmitting end to be in the sleep mode, the first off mode, the on mode and the second off mode periodically; and the input signal storing module is configured to control an analog-digital converter in the receiving end to store a first input signal in a sampling period of the receiving end corresponding to the off mode by execute the steps of:

controlling the analog-digital converter in the receiving end to store the first input signal in a sampling period of the receiving end corresponding to the first off mode.

Wherein, in one embodiment, it can also clear the data in the working units that has been occupied, by the second input signal which has been cleared after output a first intensity value corresponding to the second input signal after the clearing process.

In one embodiment, the first signal correction module is also configured to clear the data in the working units that has been occupied, by the second input signal which has been cleared after output a first intensity value corresponding to the second input signal after the clearing process. the second signal correction module 840 is configured to control the analog-digital converter in the receiving end to clear the first input signal from a received third input signal after the clearing process, in a sampling period of the receiving end corresponding to the second off mode by execute the steps of:

controlling the receiving end to acquire ambient infrared rays as the third input signal, and outputting the third input signal to the analog-digital converter of the receiving end in a sampling period of the receiving end corresponding to the second off mode;

controlling the analog-digital converter to store the third input signal in the preset working unit; and clearing the preset data in the preset working units that has been occupied by the third input signal when the number of the preset working units occupied by the third input signal is equal to the number of the preset working units occupied by the first input signal.

In one embodiment, the state determining module 850 is configured to determine an approaching state or a leaving state based on the first intensity value and the second intensity value by execute the steps of:

obtaining a proximity value by calculating an absolute value of the difference between the first intensity value and the second intensity value;

determining the proximity sensor is in the approaching state when the proximity value is greater than a first threshold; and determining the proximity sensor is in the leaving state when the proximity value is less than a second threshold.

In one embodiment, the first preset threshold is a preset proximity threshold under a strong light environment control by a display, the second threshold is a preset distant threshold under a strong light environment control by the display.

In one embodiment, the first input signal is the ambient infrared rays acquired by the receiving end when a LED lamp of the transmitting end is in an off mode, the second input signal is ambient infrared rays and infrared rays acquired by the receiving end, and the infrared rays are emitted from the LED light and reflected by a blocking object when the LED lamp of the transmitting end is in an on mode. The embodiment of the present application further provides a storage medium having a program stored therein, when the program is executed by a processor, the method for controlling a proximity sensor is performed, the method includes:

outputting, a driving signal with a preset timing and a preset duty cycle, to a transmitting end and a receiving end of a proximity sensor, controlling the transmitting end to be in a sleep mode, an off mode, and an on mode periodically, and controlling the receiving end to be in a sleep mode and a sampling mode periodically;

controlling an analog-digital converter in the receiving end to store a first input signal, in a sampling period of the receiving end corresponding to the off mode; and controlling the analog-digital converter in the receiving end to clear the first input signal from a received second input signal, and outputting a first intensity value corresponding to the second input signal after the clearing process, thereby determining an approaching state or a leaving state based on the first intensity value, in a sampling period of the receiving end corresponding to the on mode.

Storage medium—any of a variety of types of memory devices or storage devices. The term "storage medium" is intended to include: a mounting medium such as a CD-ROM, a floppy disk or a tape device; a computer system memory or a random access memory such as DRAM, DDR RAM, SRAM, EDO RAM, Rambus RAM, etc. Non-volatile memory, such as flash memory, magnetic media (such as a hard disk or optical storage); registers or other similar types of memory elements, and the like. The storage medium may also include other types of memory or a combination thereof. Additionally, the storage medium may be located in a first computer system in which the program is executed, or may be located in a different second computer system, the second computer system being coupled to the first computer system via a network, such as the Internet. The second computer system can provide program instructions to the first computer for execution. The term "storage medium" can include two or more storage media that can reside in different locations (e.g., in different computer systems connected through a network). A storage medium may store program instructions (eg, embodied as a computer program) executable by one or more processors.

Figure 9:
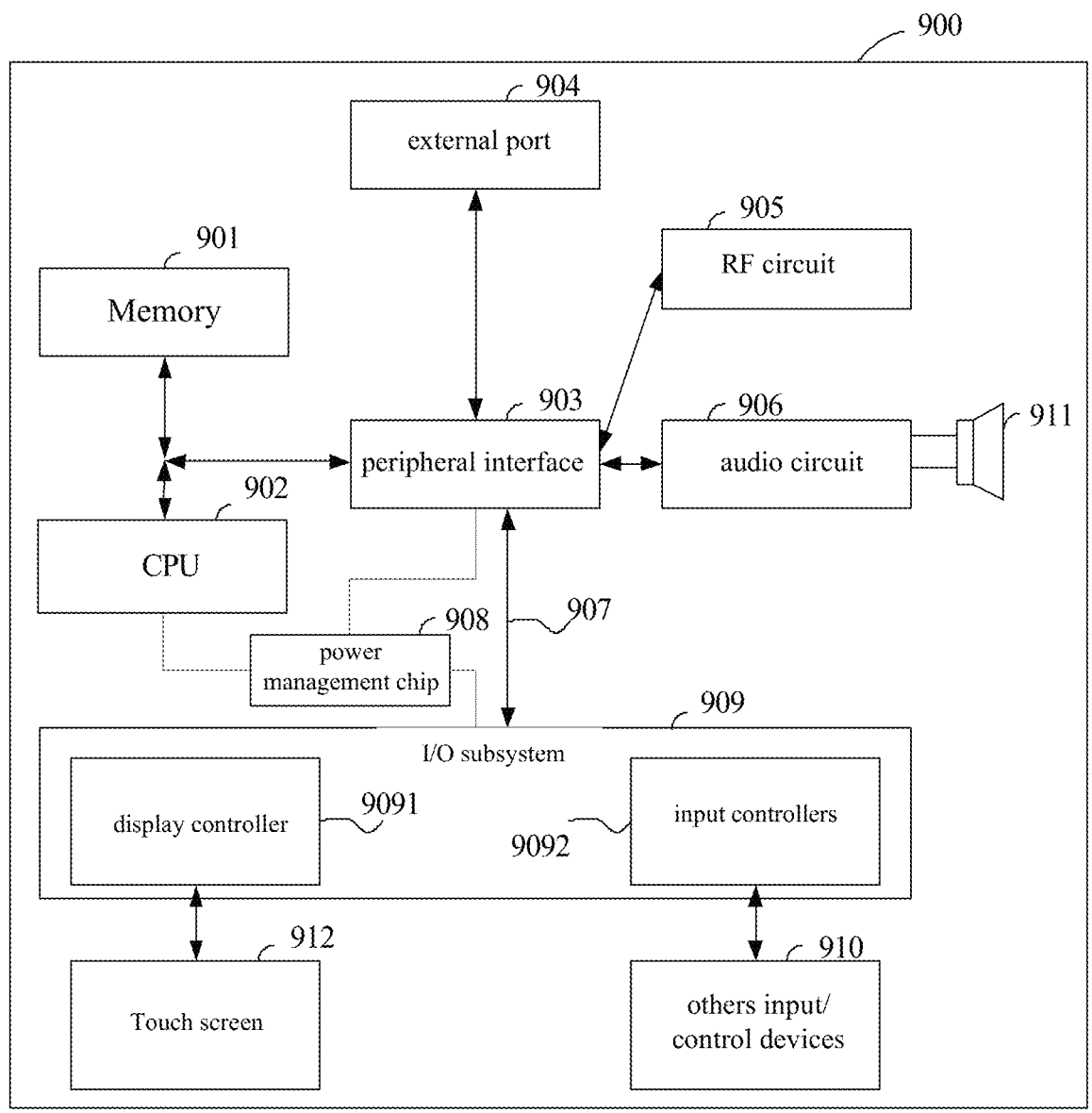
FIG. 9 is a schematic structural view of a mobile terminal according to an embodiment of the present disclosure.

Of course, the computer executable instructions are not limited to the control operation of the proximity sensor as described above, in the storage medium containing computer executable instructions provided by the embodiments of the present application, The present disclosure also provides a mobile terminal, the device described in the present disclosure is integrated into the mobile terminal mobile. FIG. 9 is a schematic structural view of a mobile terminal according to an embodiment of the present disclosure. As illustrated in FIG. 9, the mobile terminal includes a housing (not shown in the figure), a touch screen (not shown in the figure), touch buttons (not shown in the figure), a memory 901, a Central Processing Unit 902 (CPU, also known as the processor, hereinafter referred to as CPU), a circuit board (not shown in the figure) and a power circuit (not shown in the figure). The circuit board disposed inside the space enclosed by the housing, the CPU 902 and the memory are disposed on the circuit board, the power circuit is configured to supply power to each circuit or device of the mobile terminal, the memory 901, having executable program codes stored therein, the CPU 902, runs one or more computer programs corresponding to the executable program codes by reading executable program codes stored in the memory 901 to implement the following steps: outputting, a driving signal with a preset timing and a preset duty cycle, to a transmitting end and a receiving end of a proximity sensor, controlling the transmitting end to be in a sleep mode, an off mode, and an on mode periodically, and controlling the receiving end to be in a sleep mode and a sampling mode periodically;

controlling an analog-digital converter in the receiving end to store a first input signal, in a sampling period of the receiving end when it is in the off mode; and controlling the analog-digital converter in the receiving end to clear the first input signal from a received second input signal, and outputting a first intensity value corresponding to the second input signal after the clearing process, thereby determining an approaching state or a leaving state based on the first intensity value, in a sampling period of the receiving end when it is in the on mode.

Wherein, the mobile terminal further includes: a peripheral interface 903, a radio frequency (RF) circuit 905, an audio circuit 906, a speaker 911, a power management chip 908, an input/output (I/O) subsystem 909, a touch screen 912, others input/control devices 910 and external port 904, these components communicate via one or more communication buses or signal lines 907.

It should be understood that the illustrated mobile terminal 900 is merely one example of a mobile terminal, and that the mobile terminal 900 may have more or fewer components than those shown in the figure, and two or more components may be combined. Or it can have different component configurations. The various components shown in the figure can be implemented in hardware, software, or a combination of hardware and software, including at least one of one or more signal processing and application specific integrated circuits.

The mobile terminal for controlling a proximity sensor provided by this embodiment, detailed description is as follows, and the mobile terminal takes a mobile phone as an example.

The memory 901 can be accessed by the CPU 902, the peripheral interface 903, etc, and the memory 901 can include a high speed random access memory, and can also include a non-volatile memory, such as one or more magnetic disk storage devices, flash memory devices. Or other volatile solid-state storage devices.

The peripheral interface 903, which can connect the input or output peripherals of a device to the CPU 902 and the memory 901.

The I/O subsystem 909, which can connect input or output peripherals of a device to the peripheral interface 903, such as the touch screen 912 and the other input/control devices 910. The I/O subsystem 909 can includes a display controller 9091 and one or more input controllers 9092 for controlling the other input/control devices 910. Wherein, one or more input controllers 9092 receives electrical signals from the other input/control devices 910 or transmits electrical signals to the other input/control devices 910. And the other input/control devices 910 may include one or more physical buttons (press buttons, rocker buttons, etc.), a dial, a slide switch, a joystick or a click wheel. It is should be noted that the input controllers 9092 can be connected to any of the following: a keyboard, an infrared port, a USB interface, and a pointing device or a mouse.

The touch screen 912 is an input interface and an output interface between the mobile terminal and the user, and displays the visual output to the user. The visual output may include graphics, text, icons, videos, and the like.

The display controller 9091 in the I/O subsystem 909 receives an electrical signal from the touch screen 912 or transmit an electrical signal to the touch screen 912. The touch screen 912 detects the contact on the touch screen, and the display controller 9091 converts the detected contact into an interaction with the user interface object displayed on the touch screen 912, that is, realizes human-computer interaction, and the user interface object displayed on the touch screen 912 may be an icon of the game, an icon of the network to the corresponding network, and the like. It is should be noted that, the mobile terminal may also include a light mouse, which is a touch sensitive surface that does not display a visual output, or an extension of a touch sensitive surface formed by the touch screen.

The RF circuit 905 is mainly configured to establish communication between the mobile phone and the wireless network (i.e., the network side), and implement data reception and transmission between the mobile phone and the wireless network. For example, sending and receiving short messages, emails, and the like. Specifically, the RF circuit 905 receives and transmits an RF signal, which is also referred to as an electromagnetic signal, and the RF circuit 905 converts the electrical signal into an electromagnetic signal or converts the electromagnetic signal into an electrical signal, and through the electromagnetic signal to communicate with communication network and other devices. The RF circuitry 905 may include known circuitry for performing these functions including, but not limited to, an antenna system, an RF transceiver, one or more amplifiers, a tuner, one or more oscillators, a digital signal processor, a codec CODER-DECoder (CODEC) chipset, Subscriber Identity Module (SIM), etc.

The audio circuit 906 is configured to receive audio signal from the peripheral interface 903, convert the audio signal into an electrical signal, and transmit the electrical signal to the speaker 911.

The speaker 911 is configured to restore the electrical signal received by the mobile phone from the wireless network through the RF circuit 905 to sound and play the sound to the user.

The power management chip 908 is configured to supply power and power management to the hardware connected to the CPU 902, the I/O subsystem, and the peripheral interface.

The mobile terminal provided by the embodiment of the present application, by deducting the infrared rays in the ambient light in the analog-digital converter, the influence of the infrared rays in the ambient light can be eliminated, and the problem of the screen not turned off when it is in the approaching state under strong light can be avoided. Meanwhile, the problem of the splash screen in the light box environment can be avoided. Thereby achieving normal functions of the screen bright and off.

The method for controlling a proximity sensor provided by any of the embodiments of the present application, can be performed by each of the controlling device for a proximity sensor, the storage medium and the mobile terminal provided by the embodiment of the present application, and each of the controlling device for a proximity sensor, the storage medium and the mobile terminal has the corresponding functional modules and beneficial effects of implementing the method. For technical details that are not described in detail in the above embodiments, reference may be made to the method for controlling a proximity sensor provided by any of the embodiments of the present application.

What is claimed is:

1. A method for controlling a proximity sensor, comprising:
    outputting, a driving signal with a preset timing and a preset duty cycle, to a transmitting end and a receiving end of a proximity sensor, controlling the transmitting end to be in a sleep mode, an off mode, and an on mode periodically, and controlling the receiving end to be in a sleep mode and a sampling mode periodically;
    controlling an analog-digital converter in the receiving end to store a first input signal, in a sampling period of the receiving end when the transmitting end is in the off mode; and controlling the analog-digital converter in the receiving end to clear the first input signal from a received second input signal, and outputting a first intensity value corresponding to the second input signal after the clearing process, thereby determining a proximity sensor is selectively in an approaching state or a leaving state based on the first intensity value, in a sampling period of the receiving end when the transmitting end is in the on mode.

2. The method of claim 1, wherein the operation of controlling an analog-digital converter in the receiving end to store a first input signal, in a sampling period of the receiving end when the transmitting end is in the off mode comprises:
controlling the receiving end to acquire ambient infrared rays as the first input signal, and outputting the first input signal to the analog-digital converter of the receiving end, in the sampling period of the receiving end when the transmitting end is in the off mode;
controlling the analog-digital converter to store the first input signal in a plurality of preset working units; and
recording the number of the preset working units that have been occupied by the first input signal as a reference value, and clearing data in the working units that have been occupied by the first input signal, when the receiving end is switched to be in the on mode from the off mode.

3. The method of claim 2, wherein the operation of controlling the analog-digital converter in the receiving end to clear the first input signal from a received second input signal, in a sampling period of the receiving end when the transmitting end is in the on mode comprises:
in a sampling period of the receiving end when the transmitting end is in the on mode, controlling the receiving end to receive infrared rays and ambient infrared rays to form the second input signal, and outputting the second input signal to the analog-digital converter, wherein the infrared rays are emitted from the transmitting end and reflected by a blocking object;
controlling the analog-digital converter to store the second input signal in the preset working units; and
clearing the preset data in the preset working units that have been occupied by the second input signal when the number of the preset working units occupied by the second input signal is equal to the reference value.

4. The method of claim 1, wherein a time distribution of the LED lamp in the off mode, the on mode and the sleep mode is 1:1:8.

5. The method of claim 1, wherein the off mode comprises a first off mode and a second off mode, the operation of controlling the transmitting end to be in a sleep mode, an off mode, and an on mode periodically comprises:
controlling the transmitting end to be in the sleep mode, the first off mode, the on mode and the second off mode periodically; and
the operation of controlling an analog-digital converter in the receiving end to store a first input signal in a sampling period of the receiving end when the transmitting end is in the off mode comprises:
controlling the analog-digital converter in the receiving end to store the first input signal in a sampling period of the receiving end when the transmitting end is in the first off mode.

6. The method of claim 5, wherein after the operation of outputting a first intensity value corresponding to the second input signal after the clearing process, the method further comprising:

controlling the analog-digital converter in the receiving end to clear the first input signal from a received third input signal, and outputting a second intensity value corresponding to the third input signal after the clearing process, in a sampling period of the receiving end when the transmitting end is in the second off mode; and
determining the proximity sensor is selectively in the approaching state or the leaving state based on the first intensity value and the second intensity value.

7. The method of claim 6, wherein after the operation of outputting a first intensity value corresponding to the second input signal after the clearing process, the method further comprising:
clearing the data in the preset working units that have been occupied by the second input signal after clearing process; and
the operation of controlling the analog-digital converter in the receiving end to clear the first input signal from a received third input signal, in the sampling period of the receiving end when the transmitting end is in the second off mode comprises:
controlling the receiving end to acquire ambient infrared rays as the third input signal, and outputting the third input signal to the analog-digital converter of the receiving end in the sampling period of the receiving end when the transmitting end is in the second off mode;
controlling the analog-digital converter to store the third input signal in the preset working units; and
clearing the preset data in the preset working units that have been occupied by the third input signal when the number of the preset working units occupied by the third input signal is equal to the number of the preset working units occupied by the first input signal.

8. The method of claim 6, wherein the operation of determining the approaching state or the leaving state based on the first intensity value and the second intensity value comprises:
obtaining a proximity value by calculating an absolute value of the difference between the first intensity value and the second intensity value;
determining the proximity sensor is in the approaching state when the proximity value is greater than a first threshold; and
determining the proximity sensor is in the leaving state when the proximity value is less than a second threshold.

9. The method of claim 8, wherein the first threshold is a preset approaching threshold for screen control under a strong light environment, the second threshold is a preset leaving threshold for screen control under a strong light environment.

10. The method of claim 5, wherein a time distribution of the LED lamp in the first off mode, the on mode, the second off mode and the sleep mode is about 1:1:1:7.

11. The method of claim 1, wherein the first input signal is the ambient infrared rays received by the receiving end when an LED lamp of the transmitting end is in the off mode, and the second input signal is ambient infrared rays and infrared rays received by the receiving end, and the infrared rays are emitted from the LED light and reflected by a blocking object when the LED lamp of the transmitting end is in the on mode.

12. A controlling device a for proximity sensor, comprising:
a driving signal outputting module, configured to output a driving signal with a preset timing and a preset duty cycle, to a transmitting end and a receiving end of a proximity sensor, control the transmitting end to be in a sleep mode, an off mode, and an on mode periodically, and control the receiving end to be in a sleep mode and a sampling mode periodically;

an input signal storing module, configured to control an analog-digital converter in the receiving end to store a first input signal in a sampling period of the receiving end when the transmitting end is in the off mode; and a first signal correction module, configured to control the analog-digital converter in the receiving end to clear the first input signal from a received second input signal, and output a first intensity value corresponding to the second input signal after the clearing process, thereby determine a proximity sensor is selectively in an approaching state or a leaving state based on the first intensity value, in a sampling period of the receiving end when the transmitting end is in the on mode.

13. The device of claim 12, the device further comprising:

a second signal correction module, when the off mode comprises a first off mode and a second off mode, configured to control the analog-digital converter in the receiving end to clear the first input signal from a received third input signal, and output a second intensity value corresponding to the third input signal after the clearing process, in a sampling period of the receiving end when the transmitting end is in the second off mode; and a state determining module, configured to determine the proximity sensor is selectively in an approaching state or a leaving state based on the first intensity value and the second intensity value.

14. The device of claim 12, wherein the input signal storing module is configured to control an analog-digital converter in the receiving end to store a first input signal in a sampling period of the receiving end when the transmitting end is in the off mode by execute the steps of:

controlling the receiving end to acquire ambient infrared rays as the first input signal, and outputting the first input signal to the analog-digital converter in the receiving end, in the sampling period of the receiving end when the transmitting end is in the off mode;

controlling the analog-digital converter to store the first input signal in a plurality of preset working units; and recording the number of the preset working units occupied by the first input signal as a reference value, and clearing the preset data in the working units that has been occupied by the first input signal, when the receiving end is switched to be in the on mode from the off mode.

15. The device of claim 14, wherein the first signal correction module is configured to control the analog-digital converter in the receiving end to clear the first input signal from a received second input signal, and output a first intensity value corresponding to the second input signal after the clearing process, in a sampling period of the receiving end when the transmitting end is in the on mode by execute the steps of:

in a sampling period of the receiving end when the transmitting end is in the on mode, control the receiving end to acquire infrared rays and ambient infrared rays as the second input signal, and output the second input signal to the analog-digital converter, wherein the infrared rays are emitted from the transmitting end and reflected by a blocking object;

controlling the analog-digital converter to store the second input signal in the preset working units; and clearing the preset data in the preset working units that has been occupied by the second input signal when the number of the preset working units occupied by the second input signal is equal to the reference value.

16. The device of claim 12, wherein the off mode comprises a first off mode and a second off mode, the driving signal outputting module is configured to control the transmitting end to be in a sleep mode, an off mode, and an on mode periodically by execute the steps of:

controlling the transmitting end to be in the sleep mode, the first off mode, the on mode and the second off mode periodically; and the input signal storing module is configured to control an analog-digital converter in the receiving end to store a first input signal in a sampling period of the receiving end corresponding to the off mode by execute the steps of:

controlling the analog-digital converter in the receiving end to store the first input signal in a sampling period of the receiving end when the transmitting end is in the first off mode.

17. The device of claim 13, wherein the first signal correction module is also configured to clear the data in the plurality of working units that has been occupied, by the second input signal which has been cleared after output a first intensity value corresponding to the second input signal after the clearing process;

the second signal correction module is configured to control the analog-digital converter in the receiving end to clear the first input signal from a received third input signal after the clearing process, in a sampling period of the receiving end when the transmitting end is in the second off mode by execute the steps of:

controlling the receiving end to acquire ambient infrared rays as the third input signal, and outputting the third input signal to the analog-digital converter of the receiving end in a sampling period of the receiving end when the transmitting end is in the second off mode;

controlling the analog-digital converter to store the third input signal in a plurality of preset working unit; and clearing the preset data in the preset working units that has been occupied by the third input signal when the number of the preset working units occupied by the third input signal is equal to the number of the plurality of preset working units occupied by the first input signal.

18. The device of claim 13, wherein the state determining module is configured to determine an approaching state or a leaving state based on the first intensity value and the second intensity value by execute the steps of:

obtaining a proximity value by calculating an absolute value of the difference between the first intensity value and the second intensity value;

determining the proximity sensor is in the approaching state when the proximity value is greater than a first threshold; and determining the proximity sensor is in the leaving state when the proximity value is less than a second threshold.

19. A mobile terminal, comprising:

a memory, having executable program codes stored therein; and a processor, coupled to the memory;

wherein the processor invokes the executable program codes stored in the memory to perform a method for controlling a proximity sensor, the method comprising:

outputting, a driving signal with a preset timing and a preset duty cycle, to a transmitting end and a receiving end of a proximity sensor, controlling the transmitting end to be in a sleep mode, an off mode, and an on mode periodically, and controlling the receiving end to be in a sleep mode and a sampling mode periodically;

controlling an analog-digital converter in the receiving end to store a first input signal, in a sampling period of the receiving end when the transmitting end is in the off mode; and controlling the analog-digital converter in the receiving end to clear the first input signal from a received second input signal, and outputting a first intensity value corresponding to the second input signal after the clearing process, thereby determining a proximity sensor is selectively in an approaching state or a leaving state based on the first intensity value, in a sampling period of the receiving end when the transmitting end is in the on mode.

20. The mobile terminal of claim 19, wherein the off mode comprises a first off mode and a second off mode, the operation of controlling the transmitting end to be in a sleep mode, an off mode, and an on mode periodically comprises:

controlling the transmitting end to be in the sleep mode, the first off mode, the on mode and the second off mode periodically; and the operation of controlling an analog-digital converter in the receiving end to store a first input signal in a sampling period of the receiving end when the transmitting end is in the off mode comprises:

controlling the analog-digital converter in the receiving end to store the first input signal in a sampling period of the receiving end when the transmitting end is in the first off mode.

\* \* \* \* \*